United States Patent Office 2,765,302
Patented Oct. 2, 1956

2,765,302

PROCESS FOR THE PURIFICATION OF STREPTOMYCIN

Charles R. Bartels and Bernard Berk, Westfield, and Wilbur L. Bryan, New Brunswick, N. J., assignors to Olin Mathieson Chemical Corporation, a corporation of Virginia No Drawing. Application March 16, 1953,
Serial No. 342,722

14 Claims. (Cl. 260—210)

This invention relates to the purification of streptomycins and their isolation in high yield from fermentation broths.

It has been found that during the growth of a streptomycin-producing microorganism, a number of streptomycins may be formed at the same time. One of these was originally referred to as "streptomycin A," and is now designated "streptomycin," and another streptomycin obtained was originally referred to as "streptomycin B," and is now designated "mannosidostreptomycin." Moreover, there are indications that still other streptomycins are formed at the same time and/or may be formed at the same time by changes in the culture conditions. It is intended that each of such antibiotics and any mixtures thereof be comprehended by the terms "streptomycins" and "a streptomycin" as employed herein.

An object of this invention is to remove calcium, magnesium, and other polyvalent cations by means of an alkaline-earth metal sequestering agent from an eluate of a streptomycin, resulting from adsorption of the streptomycin on a cation-exchange resin and elution therefrom. Another object of this invention is to separate sodium ions from a mixture of sodium and streptomycin ions adsorbed on cation-exchange resin.

The objects of the invention may be attained by means of a multi-stage separation (i. e. including a preliminary ion-exchange purification) which comprises: (1) passing the filtrate of a streptomycin-containing broth (adjusted to pH about 5 or more) through a first column (or series of columns) containing a weak acid cation exchanger (especially a resin deriving its exchange capacity essentially from carboxylic groups), (2) eluting the streptomycin from the column, (3) adding an inorganic polyvalent-cation chelating agent to the eluate in quantity substantially sufficient to sequester the inorganic polyvalent cations (especially calcium and magnesium), (4) passing the resulting solution through a second column (or series of columns) containing a weak acid cation exchanger (especially a resin deriving its exchange capacity essentially from carboxylic groups), (5) eluting the streptomycin and (6) recovering the purified streptomycin from the eluate.

More specifically, the multi-state process may be carried out as follows: The streptomycin containing fermentation broth is acidified to pH 2.0-2.5 and filtered in the usual manner. The filtrate is adjusted to a pH of about 5.0 to 9.5, preferably about 7 to 8, with a neutralizing agent, such as sodium carbonate or sodium hydroxide, and the alkaline streptomycin solution (preferably at about 20-30° C., optimally at 25° C.) passed through a column containing a weak acid cation exchange resin deriving its exchange capacity essentially from carboxylic groups until the column is substantially saturated with streptomycin. The column is then washed with deionized water and the adsorbed streptomycin is eluted with a dilute mineral acid, preferably nitric (or hydrochloric), at a pH of about 1 to 3. The resulting solution is adjusted to a pH over 8, preferably 9.-9.5, with sodium carbonate or an equivalent neutralizing agent, and filtered. To the filtrate is added a chelating agent in amount at least sufficient to remove the inorganic polyvalent cations from the solution. Usually an excess of chelating agent is used to insure complete separation of these ions. The streptomycin is then absorbed on a second column containing a weak acid cation exchanger, and the column fractionally eluted with dilute aqueous acid at a pH of about 6 to remove impurities (especially sodium), then finally eluted with aqueous acid (e. g. sulfuric acid) at a pH of about 2.

The chelating agent used in the process may be an alpha amino acid such as ethylene diamine tetracetic acid, triglycine (the triacetic acid substitution product of ammonia), glycine, sarcosine, and polymers of (ethylenediimino) diacetic acid (U. S. Patent 2,564,092); or it may be any of the other types of chelating agents for sequestering calcium and magnesium, such as the phosphates (i. e. sodium hexametaphosphate). Ethylenediamine tetracetic acid has been found to be especially effective in the process and is preferred.

The cation exchangers used for adsorption of streptomycin are weak acid exchangers, preferably of the carboxylic type. Examples of such exchangers are those described in U. S. Patents 2,319,359; 2,333,754; 2,340,110 and 2,340,111; as well as BIOS Report 621, item 22 (1946). These resins are sold under various trade mark designations as Alkalex, Amberlite, IRC–50, Duolite CS–100; Permutit 216; Permutit H–70 and Wofatit C. Especially preferred is the resin sold under the trade mark Amberlite IRC–50.

The exchange resins (which may be used in combination as monobeds) employed for final purification (i. e. subsequent to chelation and elution), are strong acid cation exchangers and, preferably, weak base anion exchangers, although strong base anion exchangers may be used. The strong acid cation exchangers may be, for example, of the phenolic methylene sulfonic type, the nuclear sulfonic type or the sulfonated coal type. Such exchangers are described in U. S. Patents 2,191,853; 2,366,007, 2,518,420; BIOS Report 621, item 22 (1946); and U. S. Bureau of Mines Report of Investigations, No. 3559 (1941), by Broderick and Bogard; exchangers of these types are sold under various designations, such as Amberlite IR–100; Amberlite IR–105; Amberlite IR–120, Wofatit P, Wofatit K and Zeo Karb. The weak base anion exchanges are usually of the modified amine type, such as those described in U. S. Patent 2,591,573 and sold under designations Amberlite IRA–400 and Amberlite IRA–410 may be used. It is preferred to utilize the combination of Amberlite IR–120 as the strong acid cation exchanger and Amberlite IR4B as the weak base anion exchanger.

Deionized water is used in preparing the aqueous acid solutions for the elution steps. The eluate obtained by elution at a pH of about 2 is a solution of purified streptomycin (in the form of the sulfate) containing some sodium sulfate and minor amounts of other ionic compounds. To remove these contaminants, the sterptomycin solution is neutralized and deionized by means of ion exchangers. This may be done by neutralization with a weak base anion exchanger, such as IR4B (a modified amine type resin), followed by deionization using a monobed containing both cationic and anionic exchangers as, for example, equal volumes of a nuclear sulfonic cation exchanger (IR–120) and an amine anion exchanger (IR4B). Or the neutralization and deionization may be effected simultaneously by allowing the solution to pass through a monobed containing adequate quantities of exchangers for both steps as, for example, a monobed consisting of one volume of a nuclear sulfonic cation exchanger (e. g. IR–120) and two volumes of an amine anion exchanger (e. g. IR–4B).

The resulting product may be either freeze-dried (i. e. frozen followed by removal of water by sublimation) and/or treated to obtain the dihydro form, and these products used per se or in various pharmaceutical forms.

The multi-stage process may be operated advantageously using a series of exchange columns for each of the two adsorption steps. For example, a four column series may be used, with the effluent from the first column being passed to the second column and so forth. Then, when the first column is saturated with streptomycin, addition of broth filtrate to this column is stopped (i. e. the column is cut out of the series) and elution started. Meanwhile, the broth filtrate is routed through the remaining three columns in series to which series is added a fourth column wherein the elution step has been completed and the resin regenerated by standard treatment with caustic alkali. Thus, the process may be operated in continuous manner.

At times, high column-loading may be impossible because of poor broth potency. Under such circumstances, the streptomycin eluate, obtained prior to addition of the chelating agent, may be recirculated through the adsorption columns or concentrated by in vacuo distillation to effect an adequate increase in streptomycin concentration in the column.

Where desired, cobalamines (vitamin $B_{12}$ and vitamin $B_{12}$-like products) may be separated from the culture filtrate prior to the isolation of streptomycin. Thus, for example, the culture filtrate may be acidified to a pH of about 3, filtered, and the cobalamine values then absorbed on ion exchange columns. The effluent from these columns may then be adjusted to an alkaline pH, filtered and treated as herein described to purify and separate streptomycin.

It may also be mentioned at this time that the novel steps of the invention may be applied to the purification of a dihydrostreptomycin. For example, the eluate from an adsorbed culture-filtrate may be hydrogenated to form a dihydrostreptomycin, the reaction mass filtered to remove the catalyst, and the resulting solution subjected to the above-described sequestration and controlled elution steps to remove calcium, sodium, etc.

Single-stage operation (for extracting either streptomycin or dihydrostreptomycin) may be carried out by adjusting the acid filtrate to a pH above about 5, adding sufficient chelating agent to sequester the alkaline-earth metal ions, passing the solution through a cation exchanger, especially a resin deriving its exchange capacity essentially from carboxylic groups, then eluting at pH about 6.0 and finally at pH about 2.0 to obtain the purified antibiotic from the column.

It is pointed out that the process of this invention, to be most effective, requires the regulation of certain conditions. Thus, in multi-stage operation, elution of streptomycin from the initial ion exchange column is not begun until a substantial amount of the antibiotic has been adsorbed on the column and preferably, until the column has become substantially saturated with streptomycin.

Furthermore, the stage of the process for addition of chelating agent is important. Thus, it has been found that the desired purification is obtained when the chelating agent is added to the eluate obtained from the initial adsorption—but that addition of this agent to the acid filtrate (at pH 2.0–2.5) under similar conditions does not effect a comparable purification.

The effluent containing the chelated sequestering agent, may be treated to recover that agent for reuse. This may be done with ethylene diamine tetracetic acid by adjusting the hydrogen ion concentration of the effluent to pH of about 2 with an acid such as nitric acid, separating the precipitated agent, and redissolving in sodium hydroxide to form the soluble salt.

The ion exchange resins in the adsorption columns are regenerated for reuse in the usual manner.

Contamination of the streptomycin by microorganisms may occur during the purification process. Therefore, as a preventative measure, a bacteriostatic agent, preferably formaldehyde, may be added to the fermentation broth. Other agents, utilizable for this purpose include chlorinated or alkylated phenols [e. g. 2,2′-methylenebis-3.4.6-trichlorophenol (Hexachlorophene), pentachlorophenol, sodium salt (Dowicide G)], phenylmercuric salts (e. g. nitrate, chloride, etc.) and sodium (ethylmercuri) thiosalicylate [Merthiolate]. Mixtures of these agents may be also used as, for example, a mixture of sodium (ethylmercuri) thiosalicylate and pentachlorphenol, sodium salt.

The following example is illustrative of the invention:

EXAMPLE 1

Multi-stage operation (a) Preferential absorption purification: Batches of streptomycin fermentation broth (to which have been added 400 ppm. formaldehyde) are continuously acidified to pH 2.4±0.2 and filtered to remove the mycelium. About 76 kl. of this acid filtrate, having a potency of approximately 1000 units/ml. and containing about 75.6 kg. of streptomycin is adjusted to a pH of 7.0±0.2 by adding portions of an aqueous solution containing equal parts of sodium carbonate and sodium hydroxide. The resulting solution is filtered, then allowed to pass upflow through a column containing about 230 kg. of Amberlite IRC–50 (or an equivalent amount of other cation exchangers of the carboxylic type) at a rate of about 151 l./min./cm.$^2$ of cross-section until the column is saturated with streptomycin (i. e. contains about 300,000 units per gram of exchanger). The loaded column is washed with water until the washings are clear (at 1900 liters). The contents of the column are then eluted with dilute nitric acid (pH 2.4±0.2) to obtain about 5.5 kl. of eluate, having a potency of about 12,500 units/ml. and containing about 68 kg. of streptomycin.

(b) Preferential elution purification: 9.7 kl. of eluate, obtained as described in (a) is adjusted to pH 8.7±0.2 by portionwise addition of an aqueous solution of equal parts of sodium carbonate and sodium hydroxide. The calcium carbonate, which precipitates, is removed by filtration and the streptomycin solution is diluted with water to a concentration of about 1500 u./ml. (volume, approximately 44 kl.). This solution is then adjusted to pH 8 with a dilute solution (1–2N) of nitric acid and about 25 g. ethylenediamine tetracetic acid, sodium salt (in aqueous solution at pH 7.5) is added per liter of eluate. This is in excess of the amount theoretically needed but insures sequestration of all of the calcium and magnesium in the eluate. The solution, containing the sequestered cations, is then allowed to pass upflow through a cation exchange column containing about 230 kg. of a cation exchanger of the carboxylic type, e. g. Amberlite IRC–50 (or an equivalent amount of other cation exchangers of the carboxylic type) at a rate of about 151 l./min./cm.$^2$ of cross section until the resin is saturated with streptomycin (i. e. contains about 500,000 units per gram of exchanger or about 114 kg. of streptomycin). The loaded column is washed with deionized water (about 1900 liters) and then given two upflow recycle elutions with sulfuric acid at pH 6. In each elution, the sulfuric acid is recycled for 3 hours after the acid addition is completed. The acid remaining in the column after the second elution is displaced by downflow addition of deionized water. The water in the column is removed from the column, complete removal being insured by the use of air pressure. Then, agitation is begun by adding nitrogen or air through a sparger at the bottom of the column and dilute sulfuric acid (2.0N) is added to effect equilibrium at pH 2. The sulfuric acid solution of streptomycin is displaced from the column by deionized water. One additional holdup volume is collected in addition to the volume of denionized water present in the column during elution. The residual streptomycin is collected by passing three more holdup volumes of deionized water through the column and this aqueous solution is used in elution of subsequent batches. The purified streptomycin sulfate solution (425 l.), obtained by the pH 2.4±0.2 elution, has a potency of about 120,000 to 150,000 units/ml.

(c) Neutralization and deionization: The purified streptomycin sulfate solution obtained as described in (b) is allowed to pass through a column of IR–4B (an equivalent amount of other anion exchangers of the modified amine type may be used). One volume of eluate requires approximately 0.125 volumes of IR–4B resin for neutralization. The neutralized solution is then deionized by passage through a monobed consisting of equal volumes of an anion exchanger, as IR–4B, and a cation exchanger, as IR–120, a sulfonic acid type resin; one volume of eluate requires approximately 0.25 volumes of monobed.

[The neutralization and deionization may be carried out in one step by using a monobed made of two volumes of IR–45 resin and one volume of IR–120 resin, with 0.375 volumes of monobed necessary per volume of acid eluate].

In this purification step, the streptomycin solution passing through the IR–120 resin should be kept at a concentration of at least 100,000 u./ml. in order to prevent its absorption by the resin.

The purified streptomycin may then be hydrogenated or freeze-dried for use.

EXAMPLE 2

*Single-state operation*

Three resin columns, each containing about 50 ml. carboxylic acid type resin (IRC–50), are connected in series and generated with 5% aqueous sodium hydroxide, using about 0.2 gram alkali per gram of resin. Batches of streptomycin fermentation broth are continuously acidified to pH 2.4±0.2 and filtered to remove the mycelium. This acid filtrate is neutralized with aqueous sodium hydroxide, adjusted to pH about 9 with 10% aqueous sodium carbonate, and filtered. Ethylenediamine tetracetic acid (5 g./liter of solution) is added to the filtered solution, together with sufficient sodium hydroxide solution to obtain a pH about 7.5. This treated solution is then passed upflow through the columns at a rate of one milliliter per minute per milliliter of resin. The streptomycin adsorbed on the first column is eluted batchwise at pH about 6.0 with 10% aqueous sulfuric acid and the eluate discarded. A second elution is then carried out at pH about 2.0 with 10% aqueous sulfuric acid and this eluate is neutralized by passage through an anion exchange of the modified amine type resin (IR–4B or an equivalent amount of other anion exchangers may be used) to obtain a purified, neutral streptomycin solution. Two more batches of this solution are prepared in the same manner to yield a composite which is concentrated by vacuum distillation to about 250,000 u./ml., then deashed by passage through a monobed containing about 1.5 volumes of IR–4B per volume of IR–120, the amount of resin being calculated to permit absorption of about 2.0 meq. of sodium sulfate per ml. of IR–120 resin. The monobed effluent and washings are again concentrated to about 250,000 u./ml. and treated with an adsorbing carbon (Darco G–60), using about 0.2 gm. carbon/million unit. A sample lyophilized without heat gives a purity of about 761 u./mg.

On hydrogenating this product with 5% palladium on alumina using a catalyst ratio of 4/13, complete reduction to dihydrostreptomycin (purity, 750 u./mg.).

While the invention has been described in detail, it is to be understood that many changes may be made therein without departing from the spirit of the same.

We claim:

1. A process for purifying streptomycins which comprises adsorbing a streptomycin-containing broth filtrate, at a pH above about 5, on a first column containing a cation exchange resin, eluting the adsorbed streptomycin from the column with a mineral acid at a pH about 1 to 3, adjusting the eluate to a pH at least about 8, adding to the eluate an alkaline-earth-metal sequestering agent in quantity at least sufficient to sequester the alkaline-earth-metal ions, adsorbing the streptomycin from the resulting solution on a second column containing a cation exchange resin, then preferentially eluting a purified streptomycin from said second column.

2. The process of claim 1 wherein the cation exchange resins derive their exchange capacity essentially from carboxylic groups.

3. The process of claim 2 wherein the first column is allowed to become substantially saturated with streptomycin before elution.

4. The process of claim 3 wherein the second column is eluted first with aqueous acid at pH about 6, then at pH about 2 to obtain the purified streptomycin.

5. The process of claim 4 wherein the filtrate of the streptomycin-containing broth is adjusted to pH about 3, filtered and treated to separate cobalamines prior to adjusting the effluent to pH.

6. The process of claim 4 wherein the filtrate of the streptomycin-containing broth is obtained from the propagation of a streptomycin-producing strain of *Streptomyces griseus*.

7. A process for purifying streptomycins which comprises adsorbing the streptomycin from a sterptomycin-containing broth filtrate by passage, at pH about 5–9.5, through a first series of columns each containing a cation exchange resin, eluting the adsorbed streptomycin from each column, treating the total eluate with an alkaline-earth-metal sequestering agent in quantity at least sufficient to sequester the alkaline-earth-metal ions, adsorbing the sterptomycin from the treated eluate by passage through a second series of columns, each containing a cation exchange resin, then preferentially eluting to obtain a purified streptomycin.

8. The process of claim 7 in which the cation exchange resins derive their exchange capacity essentially from carboxylic groups.

9. The process of claim 8 in which elution from each of the first series of columns is not begun until that column is substantially saturated with streptomycin.

10. The process of claim 9 in which each column of the second series of columns is brought to equilibrium with aqueous acid at a pH of about 6 prior to elution of the sterptomycin.

11. The process of claim 7 in which the streptomycin solution is obtained by filtering, then adjusting to a pH about 8–9.5, the acidified fermentation broth resulting from the propagation of a streptomycin-producing strain of *Streptomyces griseus*.

12. A process for purifying streptomycins which comprises adsorbing a streptomycin-containing broth filtrate on a first cation exchange resin, eluting the adsorbed streptomycins therefrom, adding to the eluate an alkaline-earth-metal sequestering agent in quantity at least sufficient to sequester the alkaline-earth-metal ions, adsorbing the streptomycin from the resulting solution on a second cation exchange resin, and then eluting a purified streptomycin from said second cation exchange resin.

13. The process of claim 12 wherein the cation exchange resins derive their exchange capacity essentially from carboxylic groups.

14. A process for purifying streptomycin which includes the removal of sodium ions from a cation exchange resin containing sodium ions and streptomycin ions adsorbed thereon, which comprises preferentially eluting said exchange resin with an aqueous acid at a pH of about 6 to remove most of the sodium ions on said exchange resin, and then separately eluting said exchange resin with an aqueous acid at a pH substantially less than 6 to remove the streptomycin ions.

References Cited in the file of this patent

UNITED STATES PATENTS

| | | |
|---|---|---|
| 2,521,770 | Babson et al. | Sept. 12, 1950 |
| 2,528,022 | Van Dolah et al. | Oct. 31, 1950 |
| 2,528,188 | Taylor | Oct. 31, 1950 |
| 2,541,420 | Howe et al. | Feb. 13, 1951 |
| 2,550,939 | Richardson et al. | May 1, 1951 |
| 2,655,497 | Coppock | Oct. 13, 1953 |
| 2,656,300 | McCormack et al. | Oct. 20, 1953 |
| 2,656,347 | Goett et al. | Oct. 20, 1953 |